United States Patent
Hovik

(10) Patent No.: US 9,751,716 B2
(45) Date of Patent: Sep. 5, 2017

(54) CABLE GUIDE DEVICE FOR MULTI-DIAMETER CABLES

(71) Applicant: MacGregor Pusnes AS, Arendal (NO)

(72) Inventor: Jon Hovik, Færvik (NO)

(73) Assignee: MacGregor Norway AS, Kristiansand (NO)

(*) Notice: Subject to any disclaimer, the term of this patent is extended or adjusted under 35 U.S.C. 154(b) by 261 days.

(21) Appl. No.: 14/759,464

(22) PCT Filed: Jan. 3, 2014

(86) PCT No.: PCT/EP2014/050052
§ 371 (c)(1),
(2) Date: Jul. 7, 2015

(87) PCT Pub. No.: WO2014/106644
PCT Pub. Date: Jul. 10, 2014

(65) Prior Publication Data
US 2015/0353318 A1    Dec. 10, 2015

(30) Foreign Application Priority Data
Jan. 7, 2013  (NO) .................................. 20130033

(51) Int. Cl.
*B65H 54/28* (2006.01)

(52) U.S. Cl.
CPC ..... *B65H 54/2869* (2013.01); *B65H 54/2812* (2013.01); *B65H 54/2887* (2013.01)

(58) Field of Classification Search
CPC ............ B65H 54/2809; B65H 54/2812; B65H 54/2869; B65H 54/2884; B65H 54/2887
See application file for complete search history.

(56) References Cited

U.S. PATENT DOCUMENTS 4,616,791 A    10/1986   Harvey

FOREIGN PATENT DOCUMENTS

| CN | 200988710 Y | 12/2007 |
|----|-------------|---------|
| CN | 201489913 U | 5/2010 |
| CN | 102120536 A | 7/2011 |
| DE | 24 37 295 A1 | 2/1976 |
| DE | 34 38 178 A1 | 4/1986 |

(Continued)

OTHER PUBLICATIONS

Office Action in counterpart Chinese Patent Application No. 201480004199.3 issued Nov. 28, 2016 (10 pages).

(Continued)

*Primary Examiner* — William E Dondero
(74) *Attorney, Agent, or Firm* — Osha Liang LLP

(57) ABSTRACT

An apparatus and a method for guiding multi-diameter cables onto a drum by means of a cable guide device. The cable guide device includes a guiding means translationally moveable along a linear actuator, and the guiding means has an opening with a minimum spacing in a direction along the orientation of the linear actuator that is larger than the maximum cross-section of a cable to be guided inside the opening of the guiding means. Further, a cable, during use, is, most of its operational time, contacting at least one of at least two barriers, and the barriers constitute at least part of a confinement of the opening in the orientation of the linear actuator. The cable guide ensures rapid contact recuperation after loss or near loss of cable contact on one or more of the at least two barriers.

20 Claims, 6 Drawing Sheets

(56) References Cited

FOREIGN PATENT DOCUMENTS

| EP | 0 351 777 A1 | 1/1990 |
|---|---|---|
| FR | 2 435 430 A1 | 4/1980 |
| GB | 836411 A | 6/1960 |
| WO | 2009/138354 A1 | 11/2009 |

OTHER PUBLICATIONS

International Search Report issued in corresponding PCT Application No. PCT/EP2014/050052 mailed Apr. 25, 2014 (3 pages).
Written Opinion isued in corresponding PCT Application No. PCT/EP2014/050052 mailed Apr. 25, 2014 (6 pages).
Norwegian Search Report issued in Norway Patent No. 20130033 mailed Jul. 27, 2013 (2 pages).

CABLE GUIDE DEVICE FOR MULTI-DIAMETER CABLES

TECHNICAL FIELD

The present invention relates to the field of cable guide devices or spooling gear devices used for facilitating regular winding of a cable onto a drum, and a method for applying such a cable guide. The invention relates more particularly to cable guide devices capable of handling cables of different type and diameter, or to cables whose diameter varies greatly over their length, for example due to alien elements such as shackles, connection pieces and/or end terminations. The invention is particularly suited for winding large multi-diameter cables onto drums situated on ships and/or oil platforms.

BACKGROUND AND PRIOR ART

To wind large multi-diameter cables onto a drum with contiguous turns require the cable to be positioned in line with the turn to be wound. In other words, the operation requires that the position of the cable is at all time aligned with the axial winding position on the cable drum.

Such cable positioning during winding is known in the art and is generally performed using a spooling gear device provided with a guide nut which makes it possible for the section of the cable present at the cable drum to be oriented perpendicular to the axis of the cable drum, hence ensuring an appropriate wound up of the cable.

The spooling gear system is normally a system that can move translationally along an axis parallel to the rotational axis of the cable drum. The lateral movement follows the winding turn and the guide nut prevents the cable from moving laterally and vertically. Consequently, the winding of the cable onto the cable drum is accompanied by a rotational movement of the cable drum and by a lateral reciprocating movement of the spooling gear along the axis parallel to the axis of the cable drum. Matching the dimensions of the guide nut to the diameter of the cable to be wound makes it possible to precisely position the latter, hence ensuring uniform winding.

While the techniques of winding a cable or similar object onto a cable drum are generally controlled, these traditional winding techniques suffer an important disadvantage. The technique does not perform a satisfactory winding of cables in which the cable diameters change significantly due to for example attached shackles, connection pieces and/or end terminations. The guide nut simply cannot be produced without jeopardizing the guiding of the cable properly during the spooling. For example, if the nut is produced with an internal diameter large enough to accept the predicted variation in the cable diameter, the risk of non-uniform winding onto the drum is high, in particular around the mid axial length of the drum in which an undesired loss of cable contact from one side of the guide nut is expected.

Guiding devices for winding multi-diameter cables in a uniform manner onto a drum are available. One recent example is the publication WO 2009/138354 A1 wherein a cable guiding device is disclosed having a cable-guiding channel with curved and mutually offset side walls. By ensuring non-interrupted cable contact, this particular configuration does accept larger variations of the cable without manual intervention and without jeopardizing the uniform winding.

Firstly, it requires a certain bending of the cable set by on the curvature of the sidewalls, thus requiring an upper limit of its flexural rigidity. Secondly, to assure throughput of large-diameter cables it is necessary to make the spatial offset between the two curvature centers large. The result may be a device that is inconveniently long compared to the length of the cable.

There is a need, therefore, for a cable guide device that overcomes all of the disadvantages mentioned above, that is
- to assure uniform winding onto a drum, also of cables exhibiting large variations in cable diameter, for example due to alien elements such as shackles, connection pieces and/or end terminations
- to ensure satisfactory operation also for cables with high flexural rigidity, and
- to keep the length of the cable guide device low even for large cross-sectional cables.

It is thus an object of the present invention to provide a cable guide device that fulfills all of these needs.

SUMMARY OF THE INVENTION

The purpose of the present invention is to provide a method and a cable guide implementing the method through a computer program product that ensures uniform winding of a multi-diameter cable with little or no need for manual intervention of an operator during winding, hence reducing the risk of injury and/or costly interruptions.

The cable guide device in accordance with the present invention comprises a guiding means translationally moveable along a linear actuator, wherein the guiding means has an opening with a minimum spacing ($d_r$) in direction along the orientation of the linear actuator that is larger than the maximum cross-section of the cable to be guided inside the guiding means opening, and wherein a cable during use is most of its operational time, i.e. more than 50% of the time required to perform the intended winding on the drum, contacting at least one of at least two barriers, which barriers constitute at least part of the confinement of the opening in the orientation of the linear actuator, a motor connected to the cable guide device enabling controlled movement of the guiding means along the linear actuator, and preferably also a user controllable control unit being in signal communication with the motor for enabling control of the guiding means velocity ($v_r$) along the shaft.

Furthermore, the cable guide is adapted to perform at least the following method steps for each complete winding period along the axial length of drum:
- A. setting an initial guiding means velocity ($v^i_r$) of a guiding means at a first position ($x_{c1}$) monitored along the linear actuator,
- B. maintaining the initial guiding means velocity ($v^i_r$) between the first position ($x_{c1}$) and a second position ($x_{c2}$) along the linear actuator,
- C. setting a temporal guiding means velocity ($v^t_r$) of the guiding means at the second position ($x_{c2}$),
- D. maintaining the set temporal guiding means velocity ($v^t_r$) between the second position ($x_{c2}$) and a third position ($x_{c3}$) along the linear actuator,
- E. resetting the guiding means to the initial guiding means velocity ($v^i_r$) at the third position ($x_{c3}$),
- F. maintaining the set initial guiding means velocity ($v^i_r$) between the third position ($x_{c3}$) and a fourth position ($x_{c4}$) along the linear actuator,
- G. resetting the guiding means to the initial guiding means velocity ($-v^i_r$) at the fourth position ($x_{c4}$) in direction opposite to the direction in any of steps A-F, and H. maintaining the set initial guiding means velocity ($-v^i_r$) between the fourth position ($x_{c4}$) and the first position ($x_{c1}$) along at least part of the linear actuator.

All settings of the translational movements of the guiding means (1), i.e. acceleration and velocity, are performed by the motor (8) connected to the cable guide device. Note that different sign for the above mentioned velocities signify opposite direction along the linear actuator.

The motor intended to control the movement of the cable drum during use may simultaneously be used to control movement of the guiding means along the linear actuator, thus simplifying any synchronization requirements.

A complete winding period is hereinafter defined as the number of turns necessary to wind a cable onto a drum from one axial position of the drum, via the drums axial end positions and subsequent return to the initial axial position. In most cases the initial axial position is one of the two axial end positions on the drum. Such end positions may either be physical barriers set up by the particular drum, or virtual, predefined end positions set by a user or a software. All positions mentioned above are measured with reference to one end position along the linear actuator.

In addition to the above mentioned method steps, the method includes preferably also at least the following step performed during the translational movement from the fourth position ($x_{c4}$) to the first position ($x_{c1}$) in step H:

I. setting the guiding means (1) to the temporal guiding means velocity ($-v^t_r$) of the guiding means (1) at a fifth position ($x_{c5}$), J. maintaining the set temporal guiding means velocity ($-v^t_r$) between the fifth position ($x_{c5}$) and a sixth position ($x_{c6}$) along the linear actuator (5), K. resetting the guiding means (1) to the initial guiding means velocity ($-v^i_r$) at the sixth position ($x_{c6}$), and L. maintaining the set initial guiding means velocity ($-v^i_r$) between the sixth position ($x_{c6}$) and the first position ($x_{c1}$) along the linear actuator (5), wherein the steps I-L are performed during the translational movement from the fourth position ($x_{c4}$) and the first position ($x_{c1}$) in step H The second, third, fifth and sixth positions ($x_{c2}$ $x_{c3}$ $x_{c5}$ $x_{c6}$) and the temporal guiding means velocity ($v^t_r$) are chosen to ensure rapid contact recuperation after loss or near loss of cable contact on one or more of the barriers. One way to obtain such a rapid contact recuperation is to ensure that the temporal guiding means velocity ($v^t_r$) is higher than the initial guiding means velocity ($v^i_r$). The increase in velocity should preferably be more than two times the initial guiding means velocity ($v^i_r$), more preferably more than three times $v^i_r$, even more preferably more than four times $v^i_r$, for example five times $v^i_r$. Further, the acceleration and the deceleration should be as rapid as the system allows. i.e. to obtain the desired velocity without undue burden on the apparatus and without significantly jeopardizing the performance (stability, security, accuracy, etc).

Note that the absolute values of $v^i_r$ and $v^t_r$ may differ depending on the translational direction of the guiding means. The important is to ensure that the velocity changes provide rapid contact recuperation after loss or near loss of cable contact on one or more of the barriers The above mentioned method may advantageously further comprise the step of halting the guiding means at the fourth position ($x_{c4}$) for a time period corresponding to a predetermined number of revolutions of the drum (or any other predetermined time period) between the completion of step F and the initiation of step G, and/or halting the guiding means at the first position ($x_{c1}$) for a time period corresponding to a predetermined number of revolutions of the drum (or any other predetermined time period) after the completion of step L. The first and fourth position ($x_{c1}$,$x_{c4}$) are preferably located at a distance along the linear actuator being at or near the respective axial drum ends. Hereinafter, near the axial drum ends signify a distance from the most nearby position of the axial drum end that is 10% or less the full axial drum length, more preferably 5% or less.

At least one of the predetermined periods of time mentioned above is advantageously equal to twice the estimated time the cable (9) needs to complete the windings around the drum over a certain packing angular range during use. The packing angular range is hereinafter referred to as the angle range of which the cable is allowed to sweep the drum having no translational guidance set up by the guiding means (1) This range may be up to 8°, preferably less than 6°, more preferably less than 5°, for example 3°.

Furthermore, the method may advantageously include the step of monitoring, either continuously or discretely, the axial cable position ($x_d$) on the drum during use. Such monitoring may be achieved by various monitoring means such as registering the number of completed turns by the drum connected motor, with subsequent conversion into corresponding translational movements, or use of any positioning detectors (pressure detectors, optical detectors, etc.), or a combination thereof. With such position monitoring the second position ($x_{c2}$) and the fifth position ($x_{c5}$) may be defined as the guiding means position in which the measured axial cable position ($x_d$) is in the axial mid position, or near mid position, of the available cable winding area on the drum. Near mid position signify hereinafter an axial distance away from the true mid position being less than 5% of the full axial drum length.

The cable contact may be measured on at least two of the barriers, preferably as function of time, by one or more pressure detecting means. This may be followed by the estimation of the time period from the detection of loss of contact on one barrier to detection of the stable or near stable contact recuperation on the same or another barrier, with subsequent feeding of monitored information to any control unit. With such pressure information one or more of the second, third, fifth and sixth positions ($x_{c2}$ $x_{c3}$ $x_{c5}$ $x_{c6}$), as well as the temporal guiding means velocity ($v^t_r$), may be adjusted in order to further minimize the contact recuperation time. Such adjustment may be performed during operation.

In particular embodiments at least one of the barriers are configured to be translationally movable within the guiding means and/or displaceable in direction parallel to the cable to be winded and/or tiltable away from each other, in order to be more easily accept large(r) variation(s) of the cable cross section. The tilting of the barriers should be at least in a direction that corresponds to a tilt angle with a vector pointing along the linear actuator, away from the guiding means.

The cable guide device may further include means for monitoring the time period (T) for the change of cable contact during use, with subsequent feeding of monitored information to the control unit.

The cable guide device may include means for monitoring at least one cable position inside the guiding means opening as function of time during use, with subsequent feeding of monitored information to the control unit, for example by the use of one or more optical sensors. The means for monitoring may be restricted to one or more of the above mentioned barriers.

Furthermore, the spacing ($d_r$) mentioned above is preferably at least 1.5 times, more preferably two times, the maximum cross-section of the cable to be guided through the guiding means. However, the ideal spacing may vary considerably from one situation to another, for example when cables to be winded have alien elements such as shackles attached. In general the variation of the cross-section along the cable would at least partly be due to at least one of these alien elements which, taken separately, do not form part of a regular cable. The spacing ($d_r$) may also be adjusted during winding by for example use of dedicated motor and control unit.

At least two of the barriers can be of the type parallel rotatable rollers, wherein the rotation axes of the rollers are orientated perpendicular to the orientation of the linear actuator and perpendicular or near perpendicular to the cable during use. A possible extension of this embodiment is to provide the means for monitoring the rotational velocity of at least one of the rollers, and with subsequent feeding of the monitored information to the control unit. The latter may be a programmable machine, for example a computer with dedicated software for implementing the control of the motor and/or the various sensors.

The cable guide may comprise one or more parallel oriented bars (or any other elongated objects) relative to the linear actuator(s), thus increasing the stability and reliability of the invention.

At least one of the linear actuators may be a shaft having a helical structure, for example a double helical structure, thereby facilitating the translational movement of the cable guide. In the case of a double helical structure it may be advantageous to provide a structure with dissimilar pitch throughout the length of the shaft, to ensure mechanical actuated acceleration(s)/retardation(s) of the translational moving cable guide.

In another embodiment of the invention at least two of the barriers may be mutually displaced in direction perpendicular to the linear actuator(s) and parallel or near parallel to the cable to be winded during use.

The invention also includes a computer program product comprising computer-readable instructions which, when loaded and executed on a control unit, monitor the information and set the motor(s) in accordance with the method steps described above.

BRIEF DESCRIPTION OF THE DRAWINGS

These and other characteristics of the invention will be clear from the following description of the embodiments, given as non-restrictive examples, with reference to the attached sectional sketches and drawings, wherein.

DETAILED DESCRIPTION OF THE INVENTION

Figure 1:
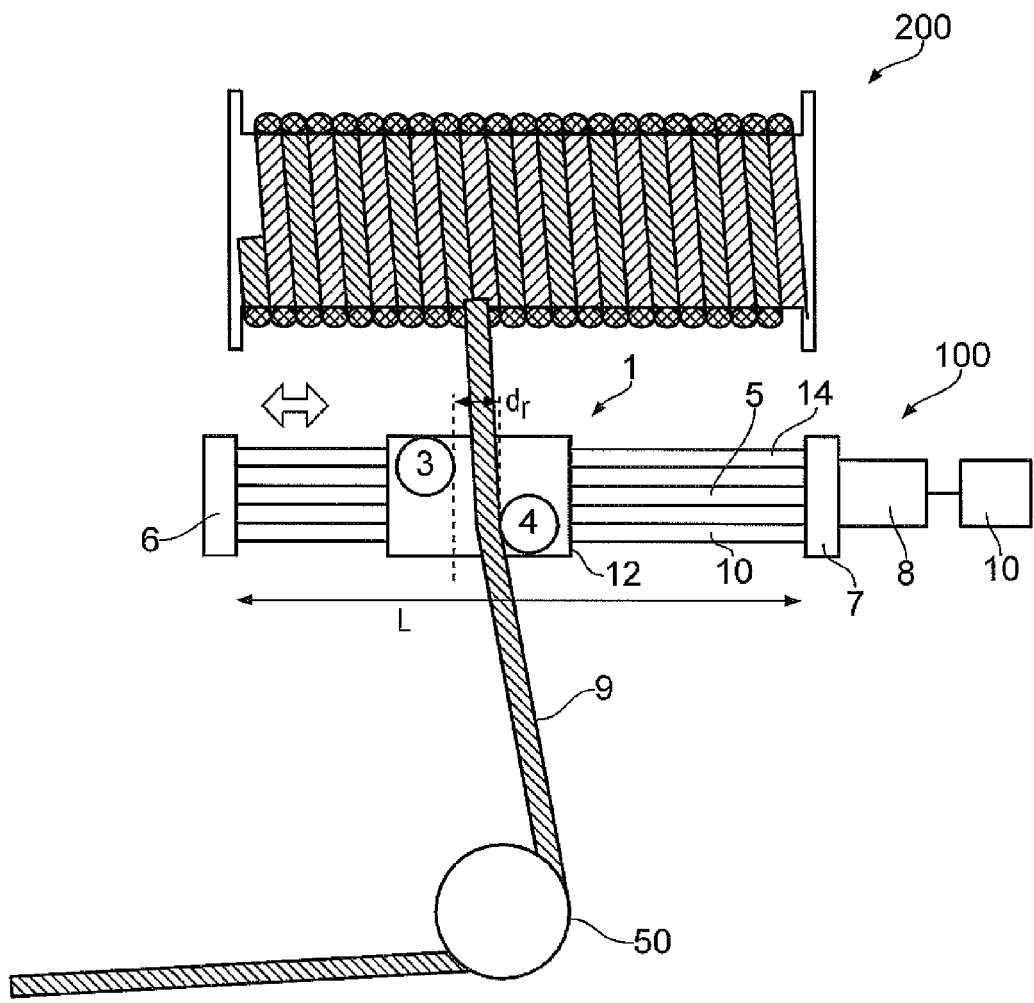
FIG. 1 is a principle top view sketch illustrating the drum and the cable guide device in accordance with the invention.
Figure 2:
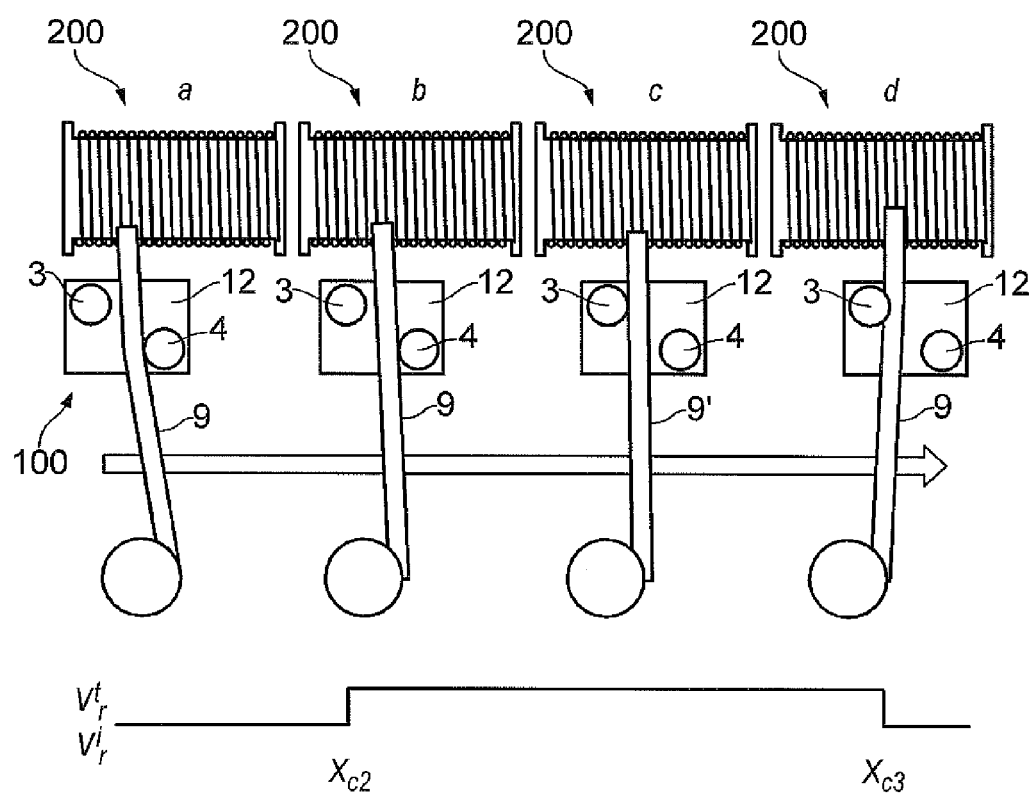
FIG. 2 is a principle top view sketch illustrating some of the steps constituting the method for guiding multi-diameter cables onto a drum in accordance with the invention.

FIGS. 1 and 2 show the principle components of the inventive cable guide device 100 comprising guiding means 1 composed of a carriage 2 and vertical positioned left and right rotatable rollers 3,4 separated by distance $d_r$. The guiding means 1 is translationally displaceable along a shaft 5 of length L, and appropriate left and right end stoppers 6,7 are installed at both the shaft's 5 longitudinal sides. The movement along the shaft 5 (in FIG. 1 indicated with a double end arrow) is set up by a step motor 8 mechanically coupled to one of the shaft's 5 ends, which motor 8 enabling control of the velocity and the acceleration of the guiding means 1. Note that the use of spatial definitions such as left, right, vertical, etc, throughout the text are only meant for facilitating the understanding of the inventive concept and should not limit the scope of protection in any way.

After ensuring that the roller spacing $d_r$ is fixed with a distance that is wider than the largest cross-section of the cable 9,9 intended to be winded the cable is prior to initiating the winding arranged between the rollers 3,4. To find the largest cross section one has to take into account any alien elements forming part of the cable 9,9' throughout the entire cable length intended to be winded. As an alternative embodiment the roller spacing $d_r$ may be adjustable by manual or automatical control means, for example an additional motor.

The axial length of the drum 200 is preferably the same, or nearly the same, as the length L of the shaft 5.

Figure 3:
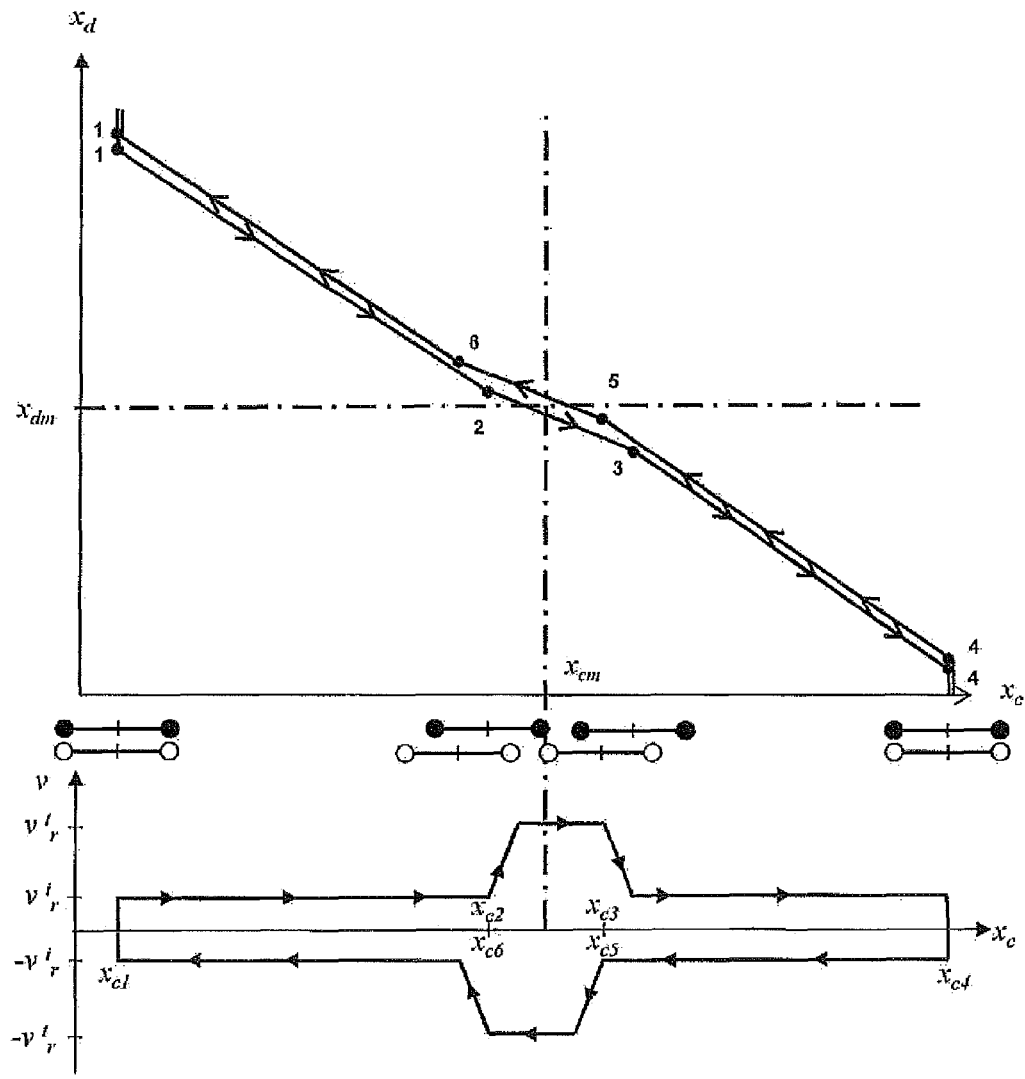
FIG. 3 shows two graphs illustrating the steps constituting the method for guiding multi-diameter cables onto a drum in accordance with the invention, wherein the upper and lower graphs show the cable position on a drum and the guiding means velocity, respectively, as function of guiding means position along the linear actuator of the cable guide device.

With reference to FIG. 2 or 3 the following description discloses the basic steps of the inventive method of the winding process: Firstly the end part of the relevant cable 9 is guided from a fixed roller 50, then through the rollers 3,4 and finally coupled to the end of the drum 200 by known means. The step motor 8 is then actuated at a time $t_0$ by a dedicated control unit 10 in order to initiate a translational movement of the guiding means 1 along the shaft 5, starting with a constant or near constant initial velocity $v^i_r$. At a certain position $x_{c2}$ along the shaft 5 the motor 8 causes an increase in the velocity v of the guiding means 1 to a new temporary velocity $v^t_r$. Then, after having reached a new position $x_{c2}$, the motor 8 resets the guiding means velocity to, or close to, its initial velocity $v^i_r$. The purpose of this increase and subsequent decrease of translational velocity is primarily to reduce the time in which the cable 9 experience no or infrequent support on one of the rollers 3,4, thus reducing the risk of non-uniform/uncontrollable cable winding onto the corresponding drum 200.

FIG. 2a-d shows the principle steps of the inventive method by way of four side-by-side illustrations of the assembly comprising the cable guide 100, drum 200 and cable 9. In this embodiment the initial translational movements of the guiding means 1 along the shaft 5 is directed from left to right (double lined arrow). When the cable 9 has reached a position approximately in the axial middle of the drum 200, the cable 9 experiences a loss of physical contact with the right roller 4 (illustration c). The duration of this undesired, non-supported cable configuration may be significantly reduced by significantly increasing the guiding means velocity, in FIGS. 2 and 3 indicated with symbols $v^i_r$ and $v^t_r$, until a desired supported cable configuration is recuperated. The graph below the four illustrations a-d indicates the guiding means positions ($x_{c2}$, $x_{c3}$) in which the control unit 10 enforces an increase in the guiding means velocity ($v^t_r$, $x_{c2}$) illustration b) and a subsequent decrease to the initial guiding means velocity ($v^i_r$, $x_{c3}$, illustration d). The "no-support" state of the cable 9' is shown in illustration c. For the three other illustrations (a, b and d) the cable 9 is in a support state, that is physical contact with one of the rollers 3,4. Note that physical contact signifies in this context both direct and indirect contact between the cable 9 and the rollers 3,4.

In a preferred embodiment a common control unit 10 is employed to activate and sustain the rotation of the corresponding drum 200. Furthermore, a common step motor 8 is preferably used in order to ensure synchronisation between the rotation of the shaft 5 and the rotation of the corresponding drum 200. Alternatively, two or more separate motors 8 may be employed, in which any synchronization is ensured by the control unit(s) 10.

Dedicated software installed on the control unit 10 allows user control of the cable guide device 100. Examples of such user control are the measurements and setting of longitudinal guiding means positions (x), the measurements and setting of guiding means velocity (v) and/or acceleration, the setting of the relative longitudinal distance and/or the perpendicular offset between the rollers/barriers 3,4, the setting of the return positions for the guiding means 1 at the left/right ends of the shaft 5, etc.

FIG. 3 discloses two graphs showing in further details how the cable position on the drum ($x_d$, upper graph) and the velocity (v, lower graph) of the guiding means 1 changes as function of the guiding means position ($x_e$). Any linear characteristics of the cable position ($x_d$) and the guiding means position ($x_e$) signify that the cable 9 exerts a non-zero force on one of the rollers 3,4. Note that the gradient of the shown linear characteristics may vary significantly depending on parameters such as velocity, stiffness of cable, weight, etc.

Both graphs of FIG. 3 are presented with a multiple of arrows to indicate the directions of the guiding means 1 movement, as well as Arabic numbers (1-6) to facilitate references to specific positions.

During a complete winding period, that is, when the cable 9 performs a full cycle onto the drum 200, a preferred embodiment of the inventive method performs the following steps:

Position 1 ($c_{c1}$)/direction from left to right:
the guiding means 1 remains still during cable winding onto the drum 200, until the cable 9 reaches a satisfactory contacting angle (packing angle) with the corresponding roller 4 (see illustration a in FIG. 2),
the initial guiding means velocity ($v^i_r$) is set, initiating a translational movement of the guiding means 1 along the shaft 5 from left to right, Interval 1-2 ($x_{c1}$-$x_{c2}$)/direction from left to right:
the initial guiding means velocity ($v^i_r$) is sustained between the first position ($x_{c1}$) and the second position ($x_{c2}$) along the shaft 5, Position 2 ($x_{c2}$)/direction from left to right:
the temporal guiding means velocity ($v^t_r$) of the guiding means (1) is set at the second position ($x_{c2}$), Interval 2-3 ($x_{c2}$-$x_{c3}$)/direction from left to right:
after achieving the set temporal guiding means velocity ($v^t_r$) the velocity is sustained along the shaft 5 until a third position ($x_{c3}$) is reached, Position 3 ($x_{c3}$)/direction from left to right:
the guiding means (1) is reset to the initial guiding means velocity ($v^i_r$) at the third position ($x_{c3}$), Interval 3-4 ($x_{c3}$-$x_{c4}$)/direction from left to right:
after achieving the set initial guiding means velocity ($v^i_r$) the velocity is sustained along the shaft 5 until a fourth position ($x_{c4}$) is reached, Position 4 ($x_{c4}$)/direction from left to right:
the guiding means 1 remains still during cable winding onto the drum 200, until the cable 9 reaches the outer axial position on the drum 200 and start "climbing" on the newly laid cable layer, Position 4 ($x_{c4}$)/direction from right to left:
the guiding means 1 remains still during cable winding in the opposite direction onto the drum 200, until the cable 9 reaches a satisfactory contacting angle (packing angle) with the corresponding roller 3,
the initial guiding means velocity ($-v^i_r$) is set, initiating a translation movement of the guiding means 1 along the shaft 5 from right to left on a new cable layer around the drum 200, Interval 4-5 ($x_{c4}$-$x_{c5}$)/direction from right to left:
the initial guiding means velocity ($-v^i_r$) is sustained between the fourth position ($x_{c4}$) and the fifth position ($x_{c2}$) along the shaft 5, Position 5 ($x_{c5}$)/direction from right to left:
the temporal guiding means velocity ($-v^t_r$) of the guiding means 1 is set at the fifth position ($x_{c5}$), Interval 5-6 ($x_{c5}$-$x_{c6}$)/direction from right to left:
after achieving the set temporal guiding means velocity ($-v^t_r$) the velocity is sustained along the shaft 5 until a sixth position ($x_{c6}$) is reached, Position 6 ($x_{c6}$)/direction from right to left:
the guiding means 1 is reset to the initial guiding means velocity ($-v^i_r$) at the sixth position ($x_{c6}$), Interval 6-1 ($x_{c6}$-$x_{c1}$)/direction from right to left:
after achieving the set initial guiding means velocity ($-v^i_r$) the velocity is sustained along the shaft 5 until the first position ($x_{c1}$) is again reached, Position 1 ($x_{c1}$)/direction from right to left:
the guiding means 1 remains still while the cable 9 is winded onto the drum 200 until the cable 9 reaches the outer axial position on the drum 200 and start "climbing" on the newly laid cable layer.

The guiding means 1 are schematically shown between the upper and lower graphs in positions 1-6 in order to ease the understanding. All settings mentioned above are performed by the control unit 10 and the motor 8 via a dedicated software stored on the control unit 10. As is apparent from FIG. 3 the positive axis is defined as directed from left to right. Guiding means velocities directed from right to left is consequently indicated with negative sign.

The guiding means positions $x_{c2}$ and $x_{c5}$, i.e. the positions where the velocity of the guiding means 1 starts to increase from an initial velocity $v^i_r$ to a temporary velocity $v^t_r$, are ideally the positions where the pressure force on the relevant roller 3,4 reaches zero due to the "head-on" direction of the cable 9 relative to the axial direction of the drum. Likewise, the guiding means positions $x_{c3}$ and $x_{c6}$, i.e. the positions where the velocity of the guiding means 1 starts to decrease from a temporary velocity $v^t_r$ to an initial velocity $v^i_r$, are ideally the positions where said pressure force again changes from zero to non-zero due to the particular cable-drum configuration. These conditions can be measured by use of various sensor devices such as optical sensors and/or pressure sensors. Alternatively the positions $x_{c2}$, $x_{c5}$, $x_{c3}$ and $x_{c6}$ may be predicted to be at or near the position ($x_d$) in which the cable 9 is located in the axial midpoint of the drum 200.

Figure 4:
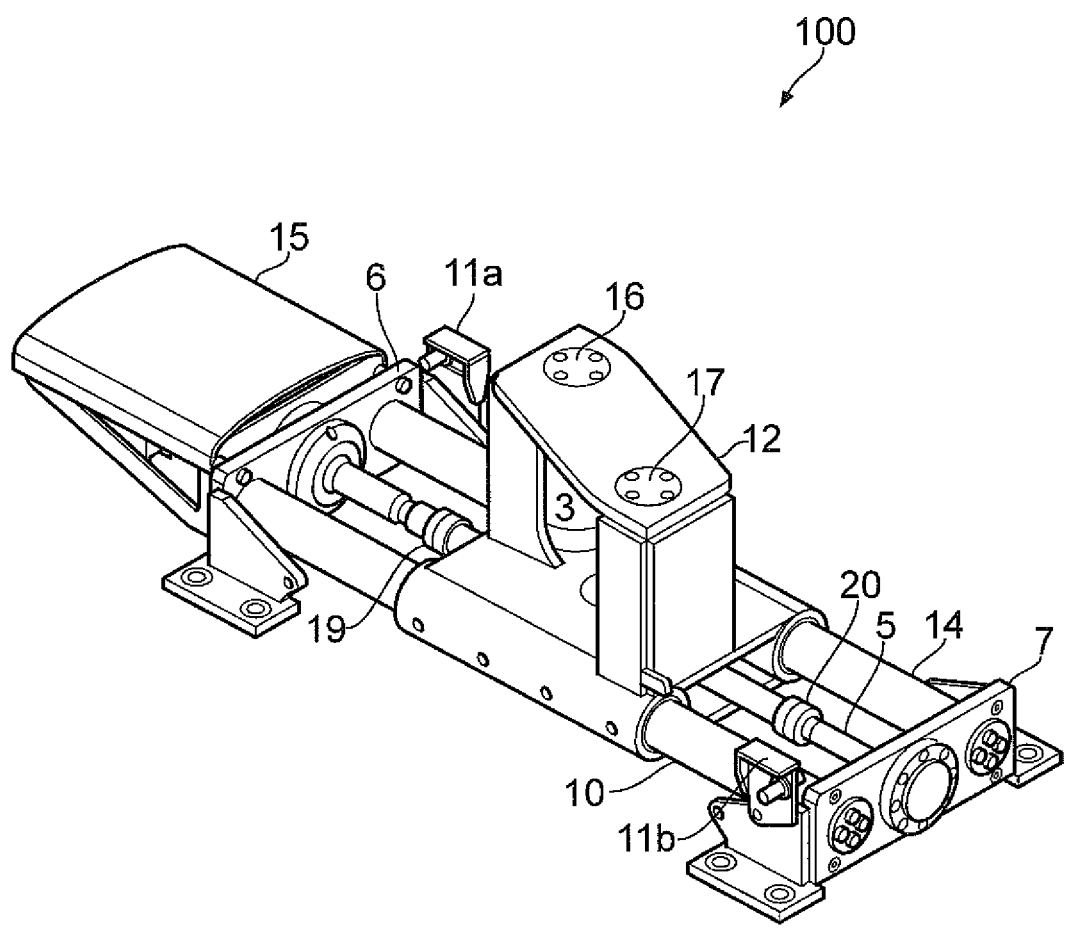
FIG. 4 is a perspective drawing illustrating one embodiment of the inventive cable guide device in accordance with the invention, wherein the guiding means is movably connected to three parallel oriented bars.
Figure 5:
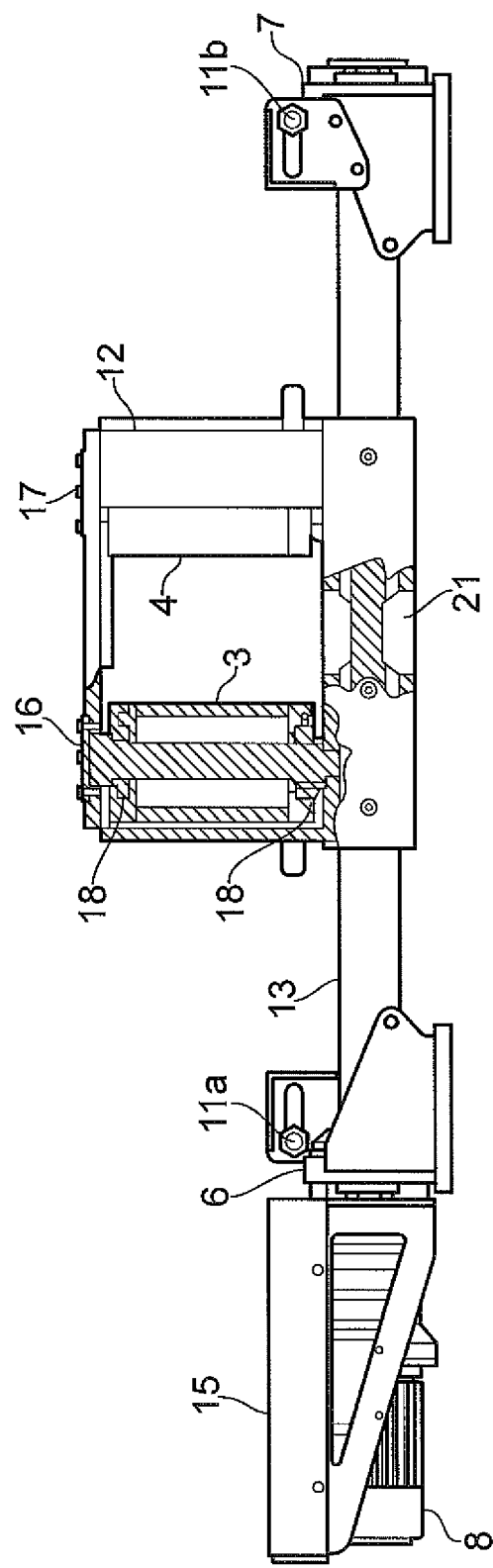
FIGS. 5 and 6 show side view sketch and a top view sketch, respectively, of the cable guide device as illustrated in FIG. 4, including a step motor.
Figure 6:
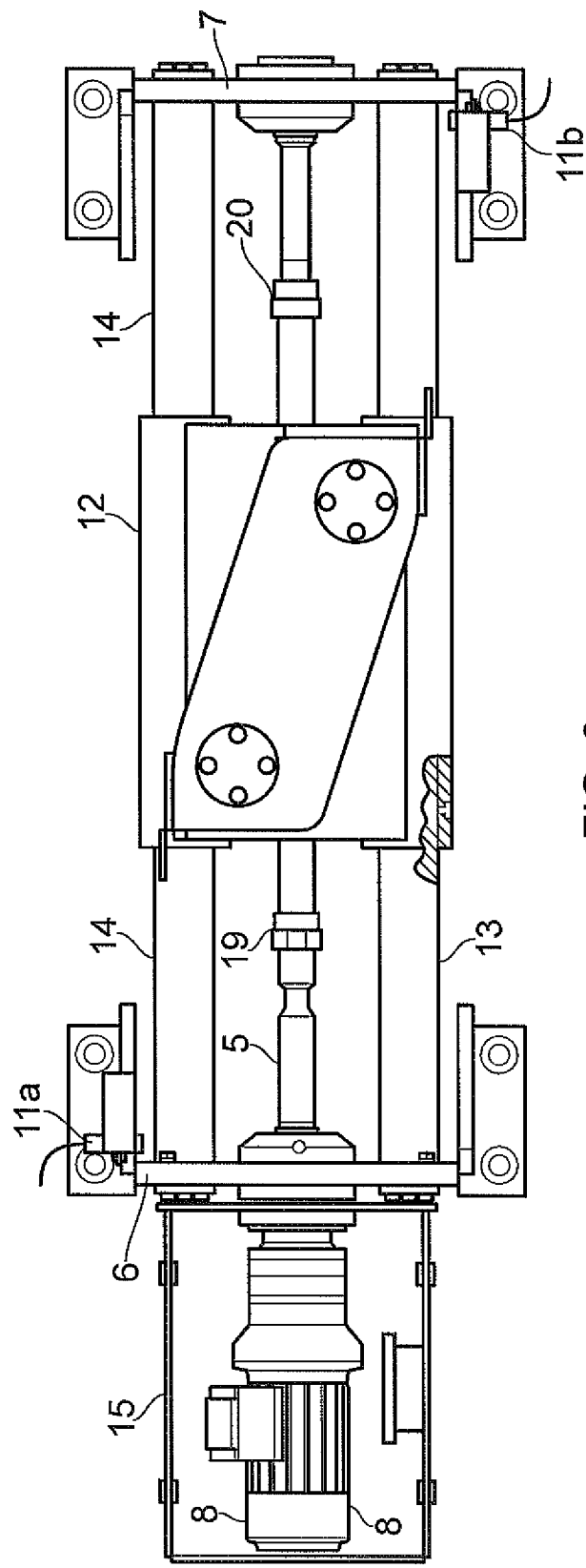

A specific embodiment of the inventive cable guide device is shown in FIGS. 3-5 in a perspective view, a side view and a top view, respectively. In these embodiments the two offset positioned, vertical directed, rollers 3,4 are situated within a guiding means house 12 by use of suitable roller flenses 16,17 and roller bearings 18. The guiding means 1 comprising the rollers 3,4, the house 12, the roller flenses 16,17 and the roller bearings 18 is seen to be translationally moveable along three bars 5,13,14. The middle bar 5 may be a shaft that at least assists the translational displacement, while the two side bars 13,14 are guiding bars to guide and further support the guiding means 1. However, the function of the bars 5,13,14 may be interchanged as convenient, for example letting all three bars contribute at least partly to the translational movement, or letting one or both of the side bars 13,14 function as displacement inducing shafts, while using the middle bar 5 as a guiding bar. This is also valid when more than three bars are used. The left and right ends 6,7 of the one or more bars 5,13,14 are shown as plates that effectively hinder further translational movements of the guiding means 1. At the vicinity of these ends 6,7 the end limit sensors 11a,11b are shown which preferably communicate with the attached control unit 10. On the other side of one of the shaft ends 6,7 a motor protection house or plate 15 may be arranged to facilitate the mounting, as well as protecting, the dedicated motor/drive 8. In FIGS. 4 and 5 also the motor 8 is shown mounted onto the shaft 5 and situated under the protection plate 15. In addition to the left and right ends 6,7 the cable guide device 100 may also be provided with additional left and right stoppers 19,20, in FIGS. 3 and 5 illustrated as displaceable threaded nuts abutting a mid stopper 21 situated in the mid lateral position of the guiding means house 12.

In a practical implementation of the invention the main winch/drum drive is also used as the drive/motor 8 of the cable guide device. Hence, the existing drive (drum) is adopted to act as a virtual master that induces the velocity and position control of the cable guide device 100, where the velocities and positions are based on estimated encoder feedback set by the dedicated software, for example via fibre optics. Synchronization and accuracy of the translational movement of the guiding means 1 can be achieved by feeding the information that is being received from inter alia two end limit sensors 11a, 11b detecting positions of the guiding means 1 at the left and right ends 6,7 of the shaft 5, as well as by actual position feedback from the motor/drive 8.

FIG. 4 gives a perspective view of a cable guide device 100 where the left end limit sensor 11a and right end limit sensor 11b are shown at the left end 6 and the right end 7, respectively. Each time the guiding means 1 reaches the end points 6,7 of the shaft 5 the software performs a partial reset of motor parameters and synchronization between the drum 200 and the cable guide device 100. As a specific example, if the total number of revolutions on the drum is 18 (counted from one side to the other) there will be partial reset and synchronization every 18 revolutions. In addition to providing positional information of the guiding means 1 to the control unit 10, the end limit sensors 11a,11b may also function as (either direct or indirect) mechanical limiters.

The invention claimed is:

1. A method for guiding multi-diameter cables onto a drum by means of a cable guide device, the cable guide device comprising a guiding means translationally moveable along a linear actuator, wherein the guiding means has an opening with a minimum spacing in a direction along an orientation of the linear actuator that is larger than a maximum cross-section of a cable to be guided inside the opening of the guiding means, and wherein the cable, during use, is, most of its operational time, contacting at least one of at least two barriers, wherein the at least two barriers constitute at least part of a confinement of the opening in the orientation of the linear actuator, the method performed for each complete winding period comprising:
    setting an initial guiding means velocity in a first direction of the guiding means at a first position monitored along the linear actuator, wherein the first direction is defined from a first position towards a second position;
    maintaining the initial guiding means velocity between the first position and the second position along the linear actuator;
    setting a temporal guiding means velocity of the guiding means at the second position;
    maintaining the set temporal guiding means velocity between the second position and a third position along the linear actuator;
    resetting the guiding means to the initial guiding means velocity at the third position;
    maintaining the set initial guiding means velocity between the third position and a fourth position along the linear actuator;
    resetting the guiding means to the initial guiding means velocity at the fourth position in a second direction that is opposite to the first direction; and
    maintaining the set initial guiding means velocity between the fourth position and the first position at least partially along the linear actuator,
    wherein all settings of translational movements of the guiding means are performed by a motor connected to the cable guide device, and
    wherein the second position, the third position, and the temporal guiding means velocity are chosen to ensure rapid contact recuperation after loss or near loss of cable contact on one or more of the at least two barriers.

2. The method in accordance with claim 1, wherein a translational movement from the fourth position to the first position further comprises:
    setting the guiding means to the temporal guiding means velocity in the second direction of the guiding means at a fifth position;
    maintaining the set temporal guiding means velocity between the fifth position to a sixth position along the linear actuator;
    resetting the guiding means to the initial guiding means velocity in the second direction at the sixth position;
    maintaining the set initial guiding means velocity between the sixth position to the first position along the linear actuator.

3. The method in accordance with claim 2, wherein the second position and the fifth position are defined as guiding means positions in which an axial cable position is in an axial mid position of available cable winding area on the drum.

4. The method in accordance with claim 1, further comprising:
    halting the guiding means at the fourth position for a time period corresponding to a predetermined number of revolutions of the drum.

5. The method in accordance with claim 1 further comprising:
    halting the guiding means at the first position for a time period corresponding to a predetermined number of revolutions of the drum.

6. The method in accordance with claim 5, wherein the time period is equal to twice an estimated time the cable needs to complete winding around the drum over a packing angular range during which the guiding means gives no translational guidance to the cable.

7. The method in accordance with claim 6, wherein the packing angular range is less than 8°.

8. The method in accordance with claim 1, wherein the first position and the fourth position are located at a distance along the linear actuator corresponding to an axial distance between two respective axial drum ends having a magnitude of 10% or less of a full axial drum length.

9. The method in accordance with claim 1, further comprising:
monitoring an axial cable position on the drum during use by one or more monitoring means.

10. The method in accordance with claim 1, further comprising:
wherein the cable contact on the at least two barriers is monitored as function of time by one or more pressure detecting means,
estimating a time period from a detection of loss of contact of the cable on one of the at least two barriers to a detection of a stable or near stable contact recuperation on the same or another of the at least two barriers; and
feeding of monitored information to a control unit.

11. The method in accordance with claim 10, wherein at least one of the second, third, fifth, and sixth positions and the temporal guiding means velocity are adjusted based on the monitored information from the pressure detecting means in order to further minimize the contact recuperation time.

12. The method in accordance with claim 1, wherein an absolute value of the temporal guiding means velocity is higher than an absolute value of the initial guiding means velocity.

13. The method in accordance with claim 1, wherein the minimum spacing is at least 1.5 times a maximum diameter of the cable being guided through the guiding means during use.

14. The method in accordance with claim 1, wherein at least two of the at least two barriers are parallel rotatable rollers, and wherein rotation axes of the parallel rotatable rollers are orientated perpendicular to the orientation of the linear actuator and perpendicular or near perpendicular to the cable to be wound during use.

15. The method in accordance with claim 1, wherein, during use, a variation of the cross-section of the cable is at least partly due to one or more alien elements which, taken separately, do not form part of the cable.

16. The method in accordance with claim 1, wherein the linear actuator is a shaft having a helical structure.

17. The method in accordance with claim 1, wherein at least two of the at least two barriers are mutually displaced in a direction perpendicular to the linear actuator and parallel or near parallel to the cable to be wound during use.

18. The method in accordance with claim 1, wherein at least one of the at least two barriers is tiltable.

19. A computer program product stored in a memory of a control unit comprising computer-readable instructions which, when loaded and executed on the control unit, perform a method for guiding multi-diameter cables onto a drum by means of a cable guide device, the cable guide device comprising a guiding means translationally moveable along a linear actuator, wherein the guiding means has an opening with a minimum spacing in a direction along an orientation of the linear actuator that is larger than a maximum cross-section of a cable to be guided inside the opening of the guiding means, and wherein the cable, during use, is, most of its operational time, contacting at least one of at least two barriers, wherein the at least two barriers constitute at least part of a confinement of the opening in the orientation of the linear actuator, the method performed for each complete winding period comprising:
setting an initial guiding means velocity in a first direction of the guiding means at a first position monitored along the linear actuator, wherein the first direction is defined from a first position towards a second position;
maintaining the initial guiding means velocity between the first position and the second position along the linear actuator;
setting a temporal guiding means velocity of the guiding means at the second position;
maintaining the set temporal guiding means velocity between the second position and a third position along the linear actuator;
resetting the guiding means to the initial guiding means velocity at the third position;
maintaining the set initial guiding means velocity between the third position and a fourth position along the linear actuator;
resetting the guiding means to the initial guiding means velocity at the fourth position in a second direction that is opposite to the first direction; and
maintaining the set initial guiding means velocity between the fourth position and the first position at least partially along the linear actuator,
wherein all settings of translational movements of the guiding means are performed by a motor connected to the cable guide device, and
wherein the second position, the third position, and the temporal guiding means velocity are chosen to ensure rapid contact recuperation after loss or near loss of cable contact on one or more of the at least two barriers.

20. A cable guide device comprising:
a velocity and position controlling linear actuator;
a guiding means translationally moveable along the linear actuator,
wherein the guiding means has an opening with a minimum spacing in a direction along an orientation of the linear actuator that is larger than a maximum cross-section of a cable to be guided inside the opening of the guiding means, and
wherein the cable, during use, is, most of its operational time, contacting at least one of at least two barriers, wherein the at least two barriers constitute at least part of a confinement of the opening in the orientation of the linear actuator;
a motor connected to the cable guide device enabling controlled movement of the guiding means along the linear actuator;
a control unit in communication with the motor for enabling control of a guiding means velocity along the linear actuator; and
a computer program product stored in a memory of the control unit that comprises computer-readable instructions that, when loaded and executed on the control unit, perform a method for each complete winding period comprising:
setting an initial guiding means velocity in a first direction of the guiding means at a first position monitored along the linear actuator, wherein the first direction is defined from a first position towards a second position;
maintaining the initial guiding means velocity between the first position and the second position along the linear actuator;

setting a temporal guiding means velocity of the guiding means at the second position;
maintaining the set temporal guiding means velocity between the second position and a third position along the linear actuator;
resetting the guiding means to the initial guiding means velocity at the third position;
maintaining the set initial guiding means velocity between the third position and a fourth position along the linear actuator;
resetting the guiding means to the initial guiding means velocity at the fourth position in a second direction that is opposite to the first direction; and
maintaining the set initial guiding means velocity between the fourth position and the first position at least partially along the linear actuator,
wherein all settings of translational movements of the guiding means are performed by the motor connected to the cable guide device, and
wherein the second position, the third position, and the temporal guiding means velocity are chosen to ensure rapid contact recuperation after loss or near loss of cable contact on one or more of the at least two barriers.

* * * * *